United States Patent
Zedda

(10) Patent No.: US 12,460,726 B2
(45) Date of Patent: Nov. 4, 2025

(54) ELECTRICALLY CONDUCTIVE DYNAMIC SEALING ELEMENT, ITS MANUFACTURING METHOD AND SEALING SYSTEM

(71) Applicant: HUTCHINSON, Paris (FR)

(72) Inventor: Alessandro Zedda, Muttenz (CH)

(73) Assignee: Hutchinson, Paris (FR)

( * ) Notice: Subject to any disclaimer, the term of this patent is extended or adjusted under 35 U.S.C. 154(b) by 28 days.

(21) Appl. No.: 18/399,037

(22) Filed: Dec. 28, 2023

(65) Prior Publication Data
US 2024/0229935 A1    Jul. 11, 2024

(30) Foreign Application Priority Data
Jan. 6, 2023    (EP) ..................... 23305019

(51) Int. Cl.
*F16J 15/3284* (2016.01)
*C23C 14/06* (2006.01)
(Continued)

(52) U.S. Cl.
CPC ....... *F16J 15/3284* (2013.01); *C23C 14/0605* (2013.01); *C23C 16/26* (2013.01); *H01B 1/04* (2013.01); *H01B 1/24* (2013.01); *H01R 39/64* (2013.01); *H01R 41/00* (2013.01); *Y10T 428/30* (2015.01)

(58) Field of Classification Search
None
See application file for complete search history.

(56) References Cited

U.S. PATENT DOCUMENTS

| 8,033,550 B2 | 10/2011 | Jacquet et al. |
| 2008/0220257 A1* | 9/2008 | Dekempeneer ....... C23C 28/343 |
| | | 428/408 |

(Continued)

FOREIGN PATENT DOCUMENTS

EP    0 779 629 B1    4/2000

OTHER PUBLICATIONS

The extended European search report, mailed on Jun. 16, 2023, in the related European Appl. No. 23305019.4.
(Continued)

*Primary Examiner* — Seth Dumbris

(57) ABSTRACT

The invention relates to a dynamic sealing element configured to establish a mobile and electrically conductive contact between a first member and a second member, at least one of which is mobile, a sealing system configured to transfer an electrical current, and a manufacturing method of the dynamic sealing element.
The dynamic sealing element (1) comprises:
  a sealing body (1a) comprising an electrically conductive polymer composite, at least on an outer surface thereof intended to face the at least one mobile member;
  an interlayer (3) comprising a first sublayer (31) of titanium and a second sublayer (32); and
  a coating layer (2) directly contacting the second sublayer (32),
wherein the coating layer (2) is based on a titanium-doped diamond-like carbon having a fixed concentration of titanium atoms of between 5% and 50%, and
wherein the second sublayer (32) is a gradient layer of titanium-doped diamond-like carbon having a varying concentration of titanium atoms decreasing across a thickness of the second sublayer (32).

20 Claims, 1 Drawing Sheet

(51) Int. Cl.
*C23C 16/26* (2006.01)
*H01B 1/04* (2006.01)
*H01B 1/24* (2006.01)
*H01R 39/64* (2006.01)
*H01R 41/00* (2006.01)

(56) References Cited

U.S. PATENT DOCUMENTS

| | | | | |
|---|---|---|---|---|
| 2010/0129615 | A1* | 5/2010 | Chizik | C23C 14/025 |
| | | | | 118/724 |
| 2012/0114964 | A1* | 5/2012 | Honda | C22C 38/04 |
| | | | | 427/249.7 |
| 2015/0147495 | A1* | 5/2015 | Kumar | B32B 1/00 |
| | | | | 428/408 |
| 2021/0148466 | A1* | 5/2021 | Von Fragstein | C08J 7/123 |

OTHER PUBLICATIONS

Khatir S. et al: "Coating diamond-like carbon films on polymer substrates by inductively coupled plasma assisted sputtering", Surface and Coatings Technology, [Online], vol. 253, Aug. 1, 2014, pp. 96-99, XP093051332.

* cited by examiner

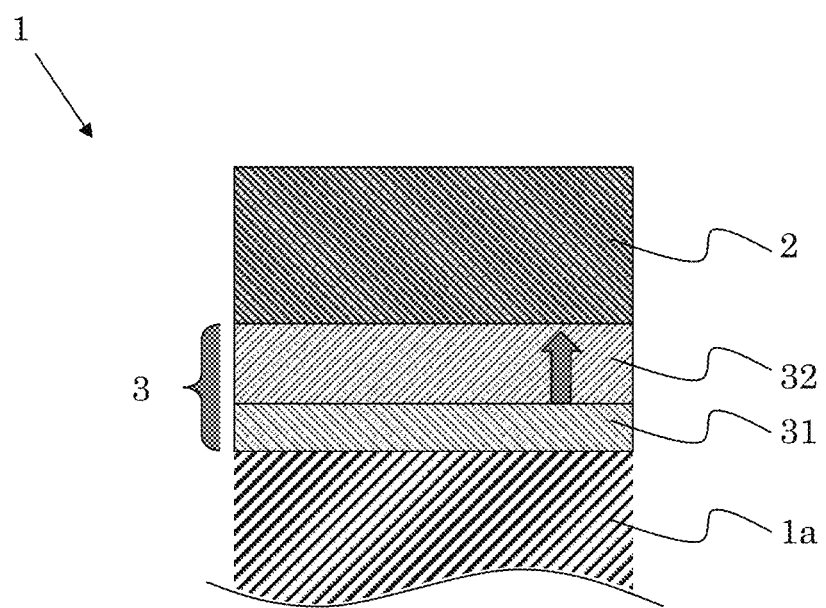

ELECTRICALLY CONDUCTIVE DYNAMIC SEALING ELEMENT, ITS MANUFACTURING METHOD AND SEALING SYSTEM

CROSS-REFERENCE TO RELATED APPLICATIONS

This application claims priority from European Patent Application No. 23305019.4 filed on Jan. 6, 2023. The European Patent Application is hereby expressly incorporated by reference herein in its entirety.

FIELD OF THE INVENTION

The invention relates to a dynamic sealing element configured to establish a mobile and electrically conductive contact between a first member and a second member, a sealing system configured to transfer an electrical current from a first member to a second member, and a manufacturing method of the dynamic sealing element. The invention generally concerns a dynamic sealing element for providing an electrical contact of a sliding type, including a linear, oscillating and/or rotary motion particularly between a first stationary member and a mobile (e.g. rotating) second member to form an electrically connected system for example able to transmit a signal.

All documents relied upon or cited to below are expressly incorporated herein by reference.

BACKGROUND OF THE INVENTION

In a known manner, dynamic seals are used as a barrier between two stationary and moving surfaces in linear (e.g. for a reciprocating piston moving within a cylinder wall), oscillating or rotary (e.g. for a shaft seal) relative motions.

Gaskets for establishing a mobile electrical contact may knowingly be made of electrically conductive polymer composites, see e.g. EP 0 779 629 B1 for electromagnetic interference (EMI) shielding, which composites combine typical properties of polymers, such as corrosion resistance, lightweight, suppression of NVH (Noise, Vibration and Harshness) and mechanical and thermomechanical properties (e.g. deformability and coefficient of thermal expansion), with a satisfactory electrical conductivity provided by the composite.

Fluorinated polymers such as polytetrafluoroethylene (PTFE) are commonly used in electrically conductive polymer composites, see EP 1 655 739 A1 e.g. for dynamic seals, due to their good resistance to oxidation, high operating temperature and low coefficient of friction. Such electrically conductive polymer composites are typically obtained by mixing a thermoformable electrically insulating polymeric material with an electrically conductive filler, such as carbon fibers, carbon black, conductive ceramic particles or metal fibers.

Nonetheless, electrically conductive polymeric composites typically undergo a progressive degradation of their electrical performance in a sliding contact of such composites with the counterpart mobile member which is made of another electrically conductive material, such as a metal (e.g. stainless steel) or a conductive ceramic. Indeed, a major drawback of such composites resides in the inherent softness and, as a consequence, in the poor wear properties of the polymeric matrix used in the composites, which is especially the case of PTFE.

When electrical current is transferred from a rotating member to a stationary member through a component made of such an electrically conductive polymeric composite, some electrical power is lost because of friction between the rotating member and the composite and also because of contact resistances. In some applications where signals are transmitted via the sliding electrical contact, a low level of material loss and thus a low friction sliding contact is therefore crucial to ensure a stable signal transfer with a low noise.

Summing up, major drawbacks of components made of an electrically conductive polymeric composite reside in their generally poor sliding contact performance and the degradation of their electrical conductivity during operation, which degradation is mainly due to a loss of the polymer composite material because of wear, which reduces the electrical performance of the electrically connected system over time and therefore the operating life of such components.

One prior attempt to overcome such limitations was to apply a thin metallic coating to an electrically conductive polymeric composite, see U.S. Pat. No. 8,394,473 B2. Such a metal coating is highly electrically conductive, however, it lacks wear resistance, which leads to a rapid degradation over time of electrical contacts.

U.S. Pat. No. 8,033,550 B2 relates to a piston ring of cast iron or cold worked steel, which is covered with a layered structure comprising:
  a first intermediate layer comprising at least one element of group IVB, group VB or group VIB;
  a second intermediate layer deposited on top of the first intermediate layer and comprising a diamond-like nanocomposite composition; and
  a diamond-like carbon (DLC) layer deposited on top of the second intermediate layer.

The layered structure of U.S. Pat. No. 8,033,550 B2 aims to provide an improved adhesion to the metallic substrate with a surface coverage protecting the substrate against corrosion, while having reduced friction losses due to sliding contact with the cylinder wall.

To the knowledge of the Applicant, such a layered structure with intermediate layers and a DLC layer has never been deposited on a substrate made of an electrically conductive polymer composite. Further, it is known that adhesion and delamination phenomena (e.g. assessed by means of peel tests) of such coating layers are very different between iron or steel substrates and polymeric ones, so that no direct extrapolation is possible from adhesion data of a layered structure deposited on a metal substrate to corresponding adhesion data on a polymeric substrate.

SUMMARY OF THE INVENTION

Provided herein is a dynamic sealing element (1) configured to establish a mobile and electrically conductive contact between a first member and a second member, at least one of which is a mobile member movable in a linear, oscillating and/or rotary motion, the dynamic sealing element comprising:
  a sealing body (1a) comprising an electrically conductive polymer composite, at least on an outer surface of the sealing body (1a) intended to face the at least one mobile member;
  an interlayer (3) comprising a first sublayer (31) of titanium directly contacting said outer surface, and a second sublayer (32) directly contacting the first sublayer (31); and a coating layer (2) directly contacting the second sublayer (32), wherein the coating layer (2) is made of a coating composition which is based on a titanium-doped diamond-like carbon, and which has a fixed concentration of titanium atoms of between 5% and 50%, inclusively, and wherein the second sublayer (32) is a gradient layer of titanium-doped diamond-like carbon having a varying concentration of titanium atoms decreasing across a thickness of the second sublayer (32), which concentration varies from 100% at a first interface with the first sublayer (31) to said fixed concentration at a second interface with the coating layer (2).

BRIEF DESCRIPTION OF THE DRAWINGS

FIG. 1 is a diagrammatic partial illustration of a dynamic sealing element corresponding to an embodiment of the invention, showing a coated sample according to example 3 below.

DETAILED DESCRIPTION OF THE INVENTION

One aim of the present invention is to provide a dynamic sealing element comprising a sealing body made of an electrically conductive polymer composite at least on an outer surface thereof, and a multilayer structure directly covering said outer surface, which particularly exhibits:

a satisfactory adhesion between the multilayer structure and the electrically conductive polymer composite, and improved and prolonged performances including dynamic sealing function, electrical conductivity and tribological properties, compared to the corresponding properties obtained with known coatings of the above-discussed prior art covering the same electrically conductive polymer composites.

This aim is achieved in that the Applicant has unexpectedly discovered that, if the multilayer structure which covers the electrically conductive polymer composite defining at least the outer surface of the sealing body comprises an interlayer comprising a first sublayer of titanium and a second sublayer which is a specific gradient layer of titanium-doped diamond-like carbon, and a coating layer based on a specific titanium-doped diamond-like carbon, then it is possible to obtain significantly improved properties over time, in particular improved mobile electrical contact and tribological properties during extended use combined with an improved wear resistance, and thus an increased operating life, together with a good adhesion of the multilayer structure to the polymer composite and a low electrical resistance of the dynamic sealing element.

Specifically, a dynamic sealing element according to the invention is configured to establish a mobile and electrically conductive contact between a first member and a second member, at least one of which being a mobile member movable in a linear, oscillating and/or rotary motion, the dynamic sealing element comprising:

a sealing body comprising an electrically conductive polymer composite, at least on an outer surface of the sealing body intended to face the at least one mobile member;

an interlayer comprising a first sublayer of titanium directly contacting said outer surface, and a second sublayer directly contacting the first sublayer; and a coating layer directly contacting the second sublayer, wherein the coating layer is made of a coating composition which is based on a titanium-doped diamond-like carbon (Ti-doped DLC), and which has a fixed atomic concentration of titanium atoms of between 5% and 50%, inclusively, and wherein the second sublayer is a gradient layer of titanium-doped diamond-like carbon having a varying concentration of titanium atoms decreasing across a thickness of the second sublayer, which concentration varies from 100% at a first interface with the first sublayer to said fixed concentration at a second interface with the coating layer.

It is to be noted that it is thus possible to coat a sealing body made of an electrically conductive polymer composite with an electrically conductive DLC, and that the obtained dynamic sealing element may have significantly improved properties, in particular an improved sliding electrical contact and tribological properties, together with an improved wear resistance and, accordingly, with a significantly prolonged operating life. The doped DLC coating deposited according to the invention also exhibits a particularly good adhesion to electrically conductive polymer composites.

It is also to be noted that, as established by the following examples, the obtained properties of the electrically conductive polymer composite and of the doped DLC coating layer result in particularly improved performances of the dynamic sealing element.

It is further to be noted that high quality dynamic sealing elements can be thus obtained with titanium as a dopant in the DLC coating layer, with said interlayer between the electrically conductive polymer composite (e.g. forming the whole sealing body) and the doped DLC coating layer, wherein the first sublayer of titanium provides a very good adhesion to the polymer composite. Even though various dopants have been presently tested (see comparative examples 1-2 below), titanium proved to provide a sufficient and prolonged high electrical conductivity and at the same time significantly contributed to improved wear resistance and tribological properties, providing a low coefficient of friction (see example 3 below).

Preferably, said coating composition consists of the titanium-doped diamond-like carbon and has said fixed concentration of titanium atoms which is of between 7% and 30% and preferably of between 10% and 20%, inclusively.

It may be noted that when said fixed concentration of titanium atoms in the coating composition is of between 5-7% approximately, there may be only one phase therein (amorphous carbon doped with titanium). This doped phase may have good tribological properties and an improved electrical conductivity, compared to an undoped DLC coating layer.

When the saturation concentration of titanium is reached in the coating composition, e.g. above 7% of titanium approximately, then a second phase of TiC nanocrystals may be generated. Such a TiC phase may improve the electrical conductivity of the coating layer, because TiC is electrically conductive (the higher the Ti content, the higher should a priori be the electrical conductivity). Nonetheless, the tribological properties of the coating layer may change if the Ti atomic % in the coating composition reaches a limit (for example of about 30% or up to 50%) where there may be a negative effect (e.g. a rough surface and/or an abrasion effect).

Advantageously, the coating layer may have:
- a bulk electrical conductivity of between $10^{-1}$ S/m and $10^4$ S/m, inclusively, measured according to ASTM D4496, and/or
- a coefficient of friction of between 0.08 and 0.2, inclusively.

Also preferably, the titanium-doped diamond-like carbon of the coating layer and optionally of the second sublayer comprises an atomic ratio of $sp^2$ hybridized carbon atoms to all carbon atoms of between 20% and 80%, preferably of between 30% and 70% (The remaining carbon atoms in the Ti-doped DLC are of between 80 and 20%, preferably of between 70 and 30%).

There are determined solubility values of titanium in carbon, and knowingly such solubility values depends on the $sp^2/sp^3$ hybridization ratio of carbon atoms, on the deposition methods, and upon whether there is hydrogen atoms in the Ti-doped DLC coating layer or not.

Said atomic ratio of $sp^2$ hybridized carbon atoms amounting to between 20% and 80%, more particularly between 30% and 70% in the Ti-doped DLC coating layer and in the second sublayer, proved to provide a sufficiently high electrical conductivity in particular in combination with a titanium concentration in the range of 10% to 20% in the coating layer, together with excellent tribological properties of the coating layer.

Also advantageously, the sealing body may consist of the electrically conductive polymer composite, which comprises a polymeric matrix and an electrically conductive filler.

According to another feature of the invention, the polymeric matrix may comprise at least one fluoropolymer, preferably a polytetrafluoroethylene (PTFE), and the electrically conductive filler may comprise electrically conductive carbon particles, preferably selected from graphite, carbon fibers, carbon black and mixtures thereof.

By way of polymeric matrix, mention may also be made of:
- all fluoropolymers for example recited in EP 1 655 739 A1, such as thermoplastic fluoropolymers (e.g. PTFE or PVDF) and fluoroelastomers (e.g. vinylidene fluoride-hexafluoropropylene copolymers, vinylidene fluoride-perfluorovinyl ether-tetrafluoroethylene terpolymers, tetrafluoroethylene-propylene-vinylidene fluoride terpolymers, tetrafluoroethylene-ethylene-perfluorovinyl ether terpolymers, vinylidene fluoride-hexafluoropropylene-tetrafluoroethylene terpolymers, tetrafluoroethylene-propylene copolymers, tetrafluoroethylene-ethylene-perfluorovinyl ether-vinylidene fluoride tetrapolymers, or tetrafluoroethylene-perfluorovinyl ether copolymers), and
- all thermoplastic elastomers (TPE) or thermoplastic vulcanizates (TPV) usable in the sealing bodies of dynamic sealing elements.

By way of electrically conductive filler, mention may also be made of carbon nanotubes, graphite fibers, metal powders, metallic alloy powders, and mixtures thereof.

More preferably, the electrically conductive polymer composite is a PTFE filled with electrically conductive carbon particles, selected from carbon black, graphite, carbon fibers, and mixtures thereof.

The electrically conductive polymer composites may thus be processed by the widespread and economically viable manufacturing processes used for thermoplastic or thermoset polymeric materials, e.g. injection molding, rotomolding, extrusion, thermoforming or compression molding.

Also preferably, the dynamic sealing element is such that:
- the first sublayer has a thickness of between 50 nm and 500 nm and preferably of between 100 nm and 350 nm, inclusively,
- the second sublayer has a thickness of between 100 nm and 500 nm and preferably of between 150 nm and 400 nm, inclusively, and
- the coating layer has a thickness of between 100 nm and 2000 nm and preferably of between 300 nm and 1200 nm, inclusively.

These preferred thicknesses have proved within the frame of the present invention to ensure simultaneously a good adhesion to the sealing body, a sufficient and prolonged electrical conductivity, a low friction and a good wear resistance over time in operation.

According to preferred embodiments of the invention, the dynamic sealing element is selected from valve seats, gaskets, washers, shaft bearings, shaft seals and slide runners, and preferably is a shaft seal.

A sealing system according to the invention is configured to transfer an electrical current from a first member to a second member, and comprises:
- the first member,
- the second member, and
- a dynamic sealing element configured to establish a mobile and electrically conductive contact between the first member and the second member,
- at least one of the first member and the second member being a mobile member movable in a linear, oscillating and/or rotary motion in electrically conductive contact with the dynamic sealing element,
- wherein the dynamic sealing element is as defined above and has said coating layer in movable contact with said mobile member,
- and preferably wherein the dynamic sealing element is a shaft seal.

It may be noted that, in operation, the dynamic sealing element is in mobile (e.g. sliding) electrical contact with a member made of another conductive material, such as a member of stainless steel, of another metal or metallic alloy or made of an electrically conductive ceramic.

In case of a conventional typical sliding electrical contact where an electrical current is transferred from a rotating member to a stationary member, some electrical power may be lost because of friction/loss of material between the rotating member and the dynamic sealing element, and also because of contact resistances. In some applications where signals are transmitted via a sliding electrical contact, a friction sliding contact involving a low loss of material and a low friction is advantageously obtained with the present invention, so as to ensure a stable signal transfer with a low noise.

A method according to the invention for manufacturing a dynamic sealing element as defined above, comprises:
a) providing the sealing body,
b) applying the first sublayer of the interlayer directly to the outer surface of the sealing body by depositing titanium atoms thereon, preferably by sputtering from a titanium target;
c) depositing the second sublayer of the interlayer directly on the first sublayer, by growing said gradient layer of titanium-doped diamond-like carbon, and
d) depositing the coating layer directly on the second sublayer, by growing the titanium-doped diamond-like carbon by a process selected from a plasma-enhanced chemical vapor deposition (PECVD), a physical vapor deposition (PVD), and a hybrid process comprising a plasma-enhanced chemical vapor deposition combined to a physical vapor deposition (PECVD-PVD).

A PECVD process is knowingly a chemical vapor deposition (CVD) process for deposition of thin films on a solid-state substrate from one or more reacting gases (in a gas state). Being a CVD process, the substrate is exposed to one or more volatile precursors, which react and/or decompose on the substrate surface to produce the desired deposit. Chemical reactions are involved in the PECVD process, which occur after creation of a plasma of the reacting gases. The plasma can be created, e.g. by applying alternating currents, such as radiofrequency (RF) alternating currents or alternating currents in the microwave range ("magnetron PECVD"), or by applying direct currents between two electrodes, reacting gases being present in a space between the electrodes.

In a PVD process, a material to be deposited on a substrate knowingly transitions from a condensed phase to a vapor phase, and then back to a thin film condensed phase on the substrate (sputtering and evaporation are well-known PVD processes, each usable in a PVD implemented in the present invention).

Preferably, step d) is implemented, during the growing of the titanium-doped diamond like carbon, by exposing the doped diamond-like carbon to a flux of positive ions, which positive ions preferably:

have an energy of between 20 eV and 100 eV, inclusively, and comprise at least one of titanium ions, argon ions, oxygen ions, nitrogen ions and carbon ions, preferably positive titanium ions.

By such an exposure to positive ions, the share of $sp^2$ hybridized carbon atoms versus the share of $sp^3$ hybridized carbon atoms is advantageously balanced, because:

an increased share of $sp^2$ hybridized carbon atoms results in a higher electrical conductivity, but in a lower hardness and thus in a lower wear resistance; and conversely an increased share of $sp^3$ hybridized carbon atoms results in a lower electrical conductivity, but in a higher hardness and thus in a higher wear resistance.

More preferably, in step d) the growing of the titanium-doped diamond like carbon simultaneously comprises:

d1) depositing carbon atoms from a carbon-containing first precursor gas, such as acetylene, by plasma-enhanced chemical vapor deposition (PECVD), or from a graphite target by physical vapor deposition (PVD), for example by sputtering; and d2) depositing the titanium dopant atoms from a titanium-containing second precursor gas, by plasma-enhanced chemical vapor deposition (PECVD), or from a solid target containing titanium atoms by physical vapor deposition (PVD), for example by sputtering.

Still more preferably, in a first embodiment of the invention, i.e. case (i):

in d1) the carbon atoms are deposited by sputtering from the graphite target, and in d2) the titanium dopant atoms are deposited by sputtering from a solid titanium target, so that step d) is implemented by PVD deposition, d1) and d2) being preferably carried out in a pulsed fashion;

or in a second embodiment of the invention, i.e. case (ii):

in d1) the carbon atoms are deposited from said carbon-containing first precursor gas, such as acetylene, by plasma-enhanced chemical vapor deposition (PECVD); and in d2) the titanium dopant atoms are deposited by sputtering from a solid titanium target, so that step d) is implemented by a hybrid deposition (PECVD-PVD) through which supplemental hydrogen atoms are introduced into the coating layer compared to case (i).

It may be noted that the pure PVD method as mentioned in the first embodiment of case (i) above and the hybrid (PVD-PECVD) process of the second embodiment of case (ii) above (with carbon atoms supplied by said first precursor gas) lead to different coating composition of the thin film forming the coating layer. Specifically, the hybrid process of case (ii) advantageously introduces said supplemental hydrogen atoms, which may make the Ti-doped DLC more similar to a polymer, therefore more compatible with the underlying polymeric matrix (e.g. of PTFE) of the electrically conductive polymer composite, and it has been presently found that such added hydrogen atoms contribute to improve the tribological properties of the coating layer of the invention.

Also preferably, growing in step c) the gradient layer of titanium-doped diamond like carbon is implemented by c1) depositing titanium atoms on the first sublayer, preferably by sputtering, and c2) depositing, during c1), carbon atoms with an increase of amount of the deposited carbon atoms, so as to obtain the titanium-doped diamond-like carbon having said varying concentration of titanium atoms decreasing across its thickness, and preferably c2) comprises, in order to obtain the increase of the amount of carbon atoms in c2), depositing the carbon atoms simultaneously with c1)

(i) from a carbon-containing first precursor gas by plasma-enhanced chemical vapor deposition (PECVD), while increasing a flow of the carbon-containing first precursor gas, such as acetylene, or (ii) from a graphite target by physical vapor deposition (PVD) via sputtering, while increasing a sputtering intensity from the graphite target.

In other words, growing the second sublayer on the first sublayer in step c) may also advantageously comprise using a hybrid (PVD-PECVD) process.

It may be noted that during the growing in step c) of the second sublayer on the first sublayer, the second layer may optionally be exposed to said flux of positive ions for the same purpose mentioned above for the coating layer grown in step d).

It may further be noted, as mentioned above for step d) and optionally also for step c), that the sputtering of both the graphite target and the titanium target may be accomplished in a pulsed fashion. A pulsed sputtering, e.g. using high-power impulse magnetron sputtering (HIPIMS), may advantageously be implemented to simplify the achievement of the titanium gradient in the second sublayer, e.g. by adjusting pulse widths during sputtering (i.e. during deposition of the second sublayer).

Alternatively, the sputtering of both the graphite target and the titanium target may be accomplished in a continuous fashion for step d) and optionally also for step c).

In a general manner in relation to any of the foregoing features, the method preferably further comprises, between steps a) and b), applying a pretreatment to the sealing body, more preferably by:

applying an etching step to the sealing body, by exposing the sealing body to a pretreatment plasma for example containing one or more of argon ions, oxygen ions, nitrogen ions and hydrogen ions;

optionally applying a cleaning step to the sealing body prior to the etching step, by washing the sealing body with water and/or with one or more organic solvents, for example under exposure to ultrasounds (by immersing the sealing body into an ultrasonic bath filled with water and/or the organic solvent(s)); and optionally further applying a surface preparation step to the sealing body, by applying a surfactant to the sealing body either before or after the etching step, for example a surfactant contained in a mixture of water and an organic solvent.

It may be noted that the etching step applied to the sealing body may provide an enhanced adhesion.

It may also be noted that the application of a surfactant may facilitate the removal of impurities present at the outer surface of the sealing body, so that the surfactant may enhance adhesion of the interlayer to this outer surface.

It will further be noted that, in case the etching step is carried out, the surfactant may be applied:

prior to the etching step, or in case the cleaning step is also carried out, the surfactant may be applied not before the cleaning step, e.g. either after or simultaneously with the cleaning step.

Other features, advantages and details of the present invention will appear upon reading the following description of several embodiments of the invention, given for illustrative and non-limiting purposes with the appended drawing described below.

EXAMPLES

The sample visible in FIG. 1 shows a dynamic sealing element 1 comprising:

a sealing body 1a made of an electrically conductive polymer composite, a coating layer 2 of a Ti-doped DLC surmounting the sealing body 1a, and an interlayer 3 which is intercalated between the sealing body 1a and the coating layer 2 by directly interfacing the sealing body 1a and the coating layer 2, the interlayer 3 consisting of a first sublayer 31 of titanium contacting an outer surface of the sealing body 1a, and of a second sublayer 32 made of a further Ti-doped DLC so as to form a gradient layer, which contacts both an outer surface of the first sublayer 31 and an inner surface of the coating layer 2.

The vertical open arrow symbolizes in FIG. 1 the direction of decreasing Ti content in the second sublayer 32 forming said gradient layer, in which the titanium concentration varies to substantially continuously decrease from 100% at the interface with the first sublayer 31, to the same titanium concentration at the interface with the coating layer 2.

Three exemplary samples able to form dynamic sealing elements were manufactured and tested in the below examples 1-3, in order to quantify the increase of electrical conductivity, of wear resistance and the improved tribological properties of their respective coatings.

Specifically, each of the sealing bodies 1a of the three manufactured dynamic sealing elements of examples 1-3 was made of the same plate-shaped sample, namely a 50×50×2 mm sample of thermoformed electrically conductive PTFE composite containing carbon fillers (AF201 25% Carbon Filled PTFE, from AFT Fluortec).

As a reference (i.e. control sample), the uncoated conductive PTFE sample presented an initial bulk resistivity of $2.10^2$ Ohm·cm, and a coefficient of friction of 0.12 which changed, after 10,000 laps for simulating wear by means of a specific tribometer, to $3.10^7$ Ohm·cm and to 0.35, respectively.

Tribological performances of the reference uncoated sample and of the three resulting coated samples were evaluated with a tribometer as described by D. Martínez-Martínez et al. Surface & Coatings Technology 442 (2022) 128405. Electrical bulk conductivities were measured according to ASTM D4496.

Comparative Example 1: Conductive PTFE Coated with a Boron-Doped DLC

The reference sample was cleaned in an ultrasonic bath with pure acetone, followed by a mixture made of 60:40 of ethanol and deionized water and 3% Capstone® FS-60 (Chemours) as a surfactant.

Once the sample was rinsed (with water) and dried under vacuum, it was placed in an equipment for radio-frequency plasma-enhanced chemical vapor deposition (RF-PECVD) and pumped to a vacuum of 1.10-3 mbar. As a pretreatment, an argon plasma was applied to the sample for 30 minutes.

Then methane gas ($CH_4$ for providing carbon for the DLC) and diborane gas ($B_2H_6$ for providing boron for doping the DLC) were introduced with flows of 40 sccm (sccm=standard cubic centimeters per minute) and 60 sccm, respectively, with a total pressure in the chamber of $2.7 \times 10^{-2}$ bar. A radiofrequency radiation amounting to 13.56 MHz was applied with a constant power of 300 W. The deposition temperature at the sample was 150° C. The operating time for deposition of the doped DLC was 30 minutes.

The resulting boron-doped DLC film was measured with a scanning electron microscope (SEM) in a cross section and exhibited a thickness of 450 nm. An average boron content of 9.5 atom % was determined using energy-dispersive X-ray spectroscopy (EDX).

The thus obtained PTFE sample coated with a boron-doped DLC coating layer showed an initial bulk resistivity of $3 \times 10^2$ Ohm·cm and an initial coefficient of friction of 0.10. After 10,000 laps for simulating wear, the coefficient of friction changed to 0.19, and the electrical resistivity changed to $5.10^2$ Ohm·cm.

An improvement over the uncoated reference sample was thus achieved.

Comparative Example 2: Conductive PTFE Coated with a Nitrogen-Doped DLC

The reference sample was cleaned in an ultrasonic bath with pure acetone, followed by a mixture made of 50:50 of isopropanol and deionized water and Capstone® FS-60 (Chemours) as surfactant.

Once the sample was rinsed (with water) and dried, a magnetron PECVD deposition equipment was used, having two parallel electrodes placed one above the other and facing each other at 40 mm distance. The upper electrode was covered with a graphite plate. A magnetic field of about 80 G at its center was applied parallel to the electrodes, using an annular permanent magnet as described in H. Kinoshita, S. Nomura, and M. Honda, J. Vac. Sci. Technol. A 18, 367, (2000).

The pretreated sample was introduced into the magnetron PECVD chamber, fixed with clamps at lower electrode. The chamber was shut and pumped to a vacuum of $3.10^{-3}$ bar, and the lower electrode was heated to 150° C. The upper and lower electrodes were then both powered at 1 KW, at 13.56 MHz magnetron frequency and a phase difference of 180° C. (by a phase shifter).

Then, firstly argon gas was introduced into the chamber at 15 sccm with a total pressure of 5 mbar to etch the PTFE composite surface with an argon plasma for 10 minutes.

In a second step, the argon gas flow to the chamber was increased to 20 sccm, and simultaneously hydrogen gas ($H_2$) was introduced, at a flow of 15 sccm, with a total pressure of 6 mbar, also for 10 minutes, so as to further prepare the surface of the sample to be coated.

Finally, the flows of argon and hydrogen were discontinued, and for generating the DLC coating, iso-butane gas ($iC4H_{10}$) and nitrogen gas ($N_2$) were introduced into the chamber with a constant flow of 50 sccm and 35 sccm, respectively, at the total pressure inside the chamber of 7 mbar, for 15 minutes.

The resulting nitrogen doped DLC coating thickness was measured in a cross section with an SEM and amounted to 800 nm. An average nitrogen content of 8 atom % was determined using energy-dispersive X-ray spectroscopy (EDX). No peeling of the DLC coating from the substrate was observed.

The nitrogen-DLC coated PTFE presented an initial electrical bulk resistivity, of $2.10^2$ Ohm·cm, an initial coefficient of friction of 0.14. After 10,000 laps, the coefficient of friction increased to 0.19 and the surface resistivity to $8.10^2$ Ohm·cm.

An improvement over the uncoated reference sample was thus achieved.

Example 3 of the Invention: Conductive PTFE Coated with a Ti-Doped DLC on an Interlayer The reference sample was cleaned in an ultrasonic bath with pure acetone, followed by a mixture made of 50:50 of isopropanol and deionized water and Capstone® FS-60 (Chemours) as surfactant.

For this example, a D.C. magnetron PECVD deposition equipment was used, comprising a Tritec 1000 (Leybold) apparatus. The reactive gas was acetylene and metallic target was metallic titanium.

Once the sample was rinsed (with water) and dried, the sample was introduced into the chamber and fixed with clamps at the electrode. Then the chamber was shut, pumped to a vacuum of 3.10-5 bar. The temperature of the substrate was measured during the deposition and did not exceed 150° C.

Firstly, argon gas was introduced in the chamber at 15 sccm to etch the PTFE composite surface with an argon plasma for 5 minutes.

Then, a pure titanium layer as a first sublayer of the interlayer was deposited by sputtering from the Ti target for 5 min. Then, a deposition of a second sublayer of the interlayer was carried out, namely of a gradient layer with a gradient titanium concentration from high to low. This was realized by introducing an increasing flow of acetylene from 1 sccm up to 30 sccm over a period of 4 minutes, while the Ti target was sputtered.

Finally, a coating layer made up of Ti-doped DLC was deposited by continuing the acetylene flow of 30 sccm for 12 minutes.

The resulting layer stack did not show any buckling or peeling from the substrate (sealing body). The cross-section of the coated sample after the DLC deposition, as analyzed by SEM, showed a 200 nm-thick first sublayer of pure titanium at the interface to the PTFE sample, covered by a 250 nm gradient layer (second sublayer) with a decreasing content of titanium, finally covered by a 800 nm-thick layer of Ti-doped DLC with 15 atom % of titanium as measured using energy-dispersive X-ray spectroscopy (EDX).

The thus obtained PTFE sample coated according to the present invention had an initial electrical bulk resistivity of $8.10^1$ Ohm·cm and an initial coefficient of friction of 0.14. After 10,000 laps, the coefficient of friction increased only to 0.19 and the bulk resistivity only to $1.10^2$ Ohm·cm.

A significant improvement over the uncoated reference sample was thus achieved.

The invention claimed is:

1. A dynamic sealing element configured to establish a mobile and electrically conductive contact between a first member and a second member, at least one of which is a mobile member movable in a linear, oscillating and/or rotary motion, the dynamic sealing element comprising:
a sealing body comprising an electrically conductive polymer composite, at least on an outer surface of the sealing body intended to face the at least one mobile member;
an interlayer comprising a first sublayer of titanium directly contacting said outer surface, and a second sublayer directly contacting the first sublayer; and
a coating layer directly contacting the second sublayer,
wherein the coating layer is made of a coating composition which is based on a titanium-doped diamond-like carbon, and which has a fixed concentration of titanium atoms of between 5% and 50%, inclusively, and
wherein the second sublayer is a gradient layer of titanium-doped diamond-like carbon having a varying concentration of titanium atoms decreasing across a thickness of the second sublayer, which concentration varies from 100% at a first interface with the first sublayer to said fixed concentration at a second interface with the coating layer.

2. The dynamic sealing element as claimed in claim 1, wherein said coating composition consists of the titanium-doped diamond-like carbon and has said fixed concentration of titanium atoms which is of between 7% and 30%.

3. The dynamic sealing element as claimed in claim 1, wherein the coating layer has:
a bulk electrical conductivity of between $10^{-1}$ S/m and $10^4$ S/m, inclusively, measured according to ASTM D4496, and/or
a coefficient of friction of between 0.08 and 0.2, inclusively.

4. The dynamic sealing element as claimed in claim 1, wherein the titanium-doped diamond-like carbon of the coating layer and optionally of the second sublayer comprises an atomic ratio of $sp^2$ hybridized carbon atoms to all carbon atoms of between 20% and 80%.

5. The dynamic sealing element as claimed in claim 1, wherein the sealing body consists of the electrically conductive polymer composite, which comprises a polymeric matrix and an electrically conductive filler.

6. The dynamic sealing element as claimed in claim 5, wherein the polymeric matrix comprises at least one fluoropolymer, and wherein the electrically conductive filler comprises electrically conductive carbon particles.

7. The dynamic sealing element as claimed in claim 1, wherein:
the first sublayer has a thickness of between 50 nm and 500 nm, inclusively,
the second sublayer has a thickness of between 100 nm and 500 nm, inclusively, and
the coating layer has a thickness of between 100 nm and 2000 nm, inclusively.

8. The dynamic sealing element as claimed in claim 1, wherein the dynamic sealing element is selected from valve seats, gaskets, washers, shaft bearings, shaft seals and slide runners.

9. A sealing system configured to transfer an electrical current from a first member to a second member, the sealing system comprising:
the first member,
the second member, and
a dynamic sealing element-configured to establish a mobile and electrically conductive contact between the first member and the second member,
at least one of the first member and the second member being a mobile member movable in a linear, oscillating and/or rotary motion in electrically conductive contact with the dynamic sealing element,
wherein the dynamic sealing element is as defined in claim 1 and has said coating layer in movable contact with said mobile member.

10. A method for manufacturing a dynamic sealing element as defined in claim 1, wherein the method comprises:
a) providing the sealing body,
b) applying the first sublayer of the interlayer directly to the outer surface of the sealing body by depositing titanium atoms thereon;
c) depositing the second sublayer of the interlayer directly on the first sublayer, by growing said gradient layer of titanium-doped diamond-like carbon, and
d) depositing the coating layer directly on the second sublayer, by growing the titanium-doped diamond-like carbon by a process selected from a plasma-enhanced chemical vapor deposition, a physical vapor deposition, and a hybrid process comprising a plasma-enhanced chemical vapor deposition combined to a physical vapor deposition (PECVD-PVD).

11. The manufacturing method of claim 10, wherein step d) is implemented, during the growing of the titanium-doped diamond like carbon, by exposing the doped diamond-like carbon to a flux of positive ions.

12. The manufacturing method of claim 11, wherein in step d) the growing of the titanium-doped diamond like carbon simultaneously comprises:
d1) depositing carbon atoms
from a carbon-containing first precursor gas, by plasma-enhanced chemical vapor deposition, or
from a graphite target by physical vapor deposition (PVD); and
d2) depositing the titanium dopant atoms
from a titanium-containing second precursor gas, by plasma-enhanced chemical vapor deposition (PECVD), or
from a solid target containing titanium atoms by physical vapor deposition (PVD).

13. The manufacturing method of claim 12, wherein in a first case:
in d1) the carbon atoms are deposited by sputtering from the graphite target, and
in d2) the titanium dopant atoms are deposited by sputtering from a solid titanium target, so that step d) is implemented by PVD deposition;
or wherein in a second case:
in d1) the carbon atoms are deposited from said carbon-containing first precursor gas, s by plasma-enhanced chemical vapor deposition (PECVD); and
in d3) the titanium dopant atoms are deposited by sputtering from a solid titanium target, so that step d) is implemented by hybrid deposition (PECVD-PVD) through which supplemental hydrogen atoms are introduced into the coating layer compared to case.

14. The manufacturing method of claim 10, wherein growing in step c) the gradient layer of titanium-doped diamond like carbon is implemented by
c1) depositing titanium atoms on the first sublayer, and
c2) depositing, during c1), carbon atoms with an increase of amount of the deposited carbon atoms, so as to obtain the titanium-doped diamond-like carbon having said varying concentration of titanium atoms decreasing across its thickness.

15. The manufacturing method of claim 10, wherein the method further comprises, between steps a) and b), applying a pretreatment to the sealing body.

16. The dynamic sealing element as claimed in claim 2, wherein said coating composition has said fixed concentration of titanium atoms which is of between 10% and 20%, inclusively.

17. The dynamic sealing element as claimed in claim 4, wherein the titanium-doped diamond-like carbon of the coating layer and optionally of the second sublayer comprises an atomic ratio of sp2 hybridized carbon atoms to all carbon atoms of between 30% and 70%.

18. The dynamic sealing element as claimed in claim 6, wherein the polymeric matrix comprises at least one polytetrafluoroethylene, and wherein the electrically conductive filler comprises electrically conductive carbon particles selected from graphite, carbon fibers, carbon black and mixtures thereof.

19. The dynamic sealing element as claimed in claim 7, wherein:
the first sublayer has a thickness of between 100 nm and 350 nm, inclusively,
the second sublayer has a thickness of between 150 nm and 400 nm, inclusively, and
the coating layer has a thickness of between 300 nm and 1200 nm, inclusively.

20. The sealing system as claimed in claim 9, wherein the dynamic sealing element is a shaft seal.

* * * * *